United States Patent [19]

Whelan

[11] 3,853,144

[45] Dec. 10, 1974

[54] FLOWMETER

[75] Inventor: James M. Whelan, Los Angeles, Calif.

[73] Assignee: University of Southern California, Los Angeles, Calif.

[22] Filed: Mar. 9, 1973

[21] Appl. No.: 339,893

[52] U.S. Cl. .................................................. 137/608
[51] Int. Cl. ............................................. F16k 11/20
[58] Field of Search .......... 137/608, 609, 597, 606, 137/63 R; 73/23

[56] References Cited
UNITED STATES PATENTS

| 1,884,896 | 10/1932 | Smith | 73/23 |
| 3,009,479 | 11/1971 | Flanders et al. | 137/612.1 |
| 3,280,834 | 10/1966 | Zahuranec | 137/612.1 |
| 3,524,444 | 8/1970 | Ellard et al. | 137/256 |
| 3,532,120 | 10/1970 | Beahm et al. | 137/612.1 X |
| 3,633,618 | 1/1972 | Blackmore et al. | 137/597 |
| 3,712,325 | 1/1973 | Harnoncourt | 137/597 |
| 3,726,300 | 4/1973 | Chevalier | 137/606 X |
| 3,731,704 | 5/1973 | Lerris | 137/612.1 |

Primary Examiner—Henry T. Klinksiek
Attorney, Agent, or Firm—Harris, Kern, Wallen & Tinsley

[57] ABSTRACT

A gas flowmeter or regulator including a capillary tubing for delivering a desired and predetermined mass flow of a gas from the outlet of the meter.

2 Claims, 1 Drawing Figure

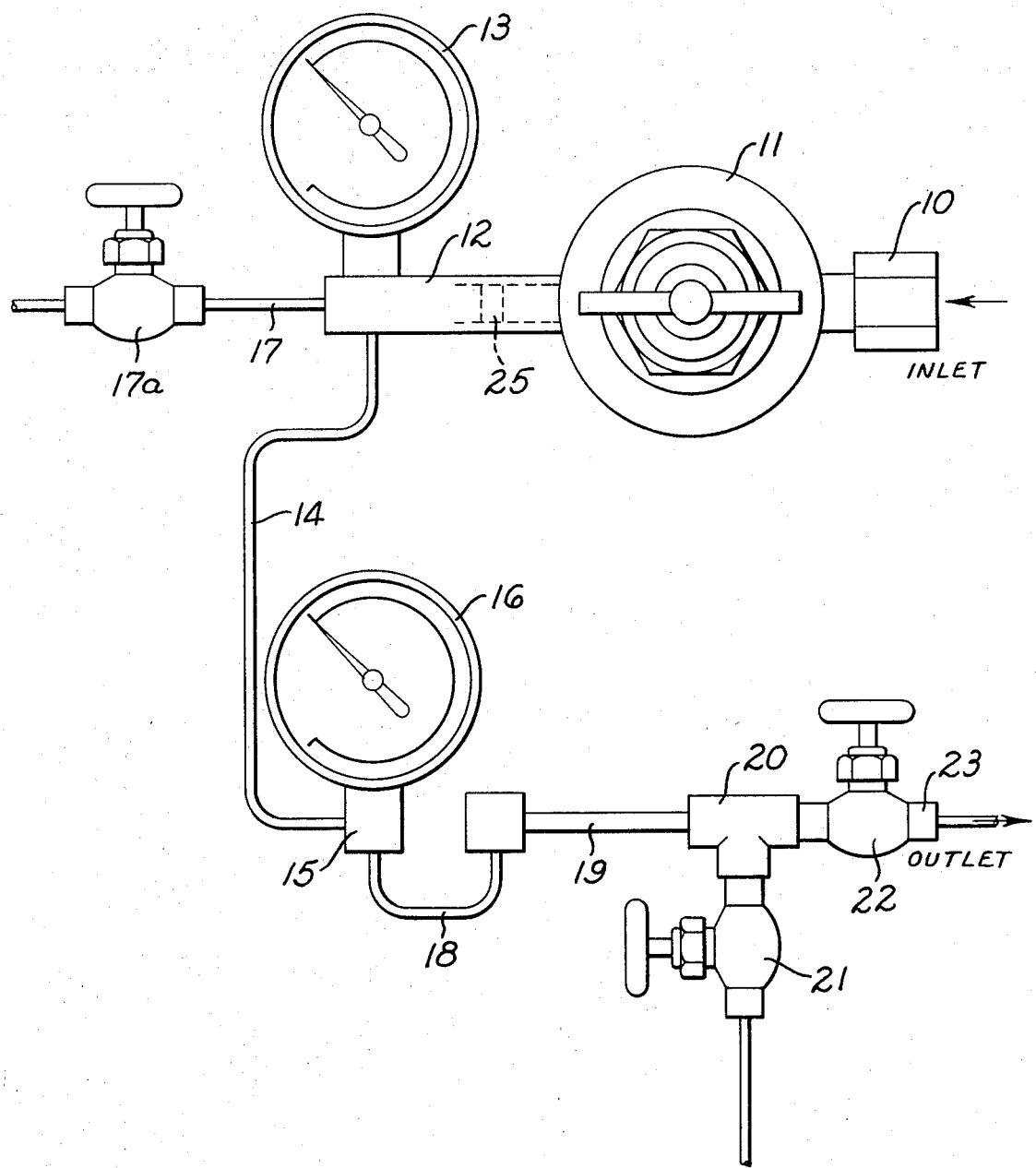

FLOWMETER

BACKGROUND OF THE INVENTION

It is frequently desirable to deliver uniformly a small metered amount of a gas for use at or near atmospheric pressure from a gas supply supplying the gas at a relatively elevated pressure (e.g., 5–3,000 p.s.i.g.), the gas flow to be delivered, for example, being within the range of only a few hundredths of a cubic centimeter to several cubic feet per minute. The only known equipment currently on the market for attempting to achieve such objective is relatively complex, expensive, and has other disadvantages, some of which are noted hereinafter.

Conventional equipment on the market for delivering a small metered flow of a gas commonly includes a pressure regulating valve for delivering the gas at a substantially uniform desired pressure to the equipment, a needle valve to reduce the mass flow of the gas to a desired flow rate and pressure, and a float-type flowmeter for indicating the mass flow delivered from the needle valve. Such pressure regulating valves are commonly supplied with standard gas cylinders, and commonly include a pressure gauge for indicating the delivery pressure of the gas from the cylinder. My experience is that such standard needle valves, rated for delivering small flows of gas over small ranges, are expensive and relatively inaccurate in their performance. Similarly, my experinece with standard float-type flowmeters is that they are expensive and relatively inaccurate, particularly at gas flows near the lower practical limits of the flowmeter. Furthermore, in such conventional equipment the necessary interconnections between the needle valve, or valves, and the flowmeter are potential sources of real or apparent leaks, introduce problems of providing seals, such as O-rings, which add to the expense of the equipment and become sources of trouble in the handling of high-purity corrosive and noncorrosive gases. Such float-type flowmeters require careful vertical mounting, must be located in the gas stream, and do not lend themselves to remote reading, all of which are disadvantages.

THE INVENTION

A primary object of this invention is to provide a meter for delivering and regulating small mass flows of gas from a high pressure source, which is cheaper to produce and more efficient in operation than conventional devices currently on the market intended for the same general operation. I accomplish this general purpose primarily by substituting a capillary flow tubing for the standard needle valve of such conventional devices.

A further object of the invention is to provide such a meter which will operate effectively with either corrosive or noncorrosive, high purity or low purity, gases, or mixtures thereof, without contaminating or diluting the gas flow.

Another object of the invention is to provide such a flowmeter which can be built from inexpensive components readily available on the market.

Still another object of the invention is to provide such a flowmeter which includes a means for indicating any malfunction in the meter during operation.

A further object of the invention is to provide such a meter in which the range of its operation can be changed readily and cheaply by simply substituting one capillary tubing for another in the device.

Another object of the invention is to provide such a flowmeter in which the pressure drop across each of the connections to the capillary tubing is small in comparison to the pressure drop across the capillary tubing, but in which the internal diameters of such connections are small enough to insure that gas velocities through them are high enough to prevent back flow of the gas passing therethrough.

DETAILED SPECIFICATION OF EMBODIMENT OF INVENTION

Referring to the schematic drawing, FIG. 1 shows an inlet 10, which may be a standard pipe or tubing coupling adapted to be connected to a conventional gas source (not shown). Such gas source may be a standard gas cylinder or bottle containing a gas, e.g., He, $H_2$, $O_2$, $N_2$, CO, $CO_2$, Ar, or NO, at 3000 high pressure, e.g., 3000 p.s.i.g.

The inlet 10 is connected to a standard variable pressure regulator 11 which may be adjusted manually to deliver the gas supplied from the gas source at a desired and lower pressure than the gas in the gas source, e.g., a delivery pressure of 30 p.s.i.g. Connected to the pressure regulator 11 is a connector 12, normally a section of tubing, to which is connected a first gauge 13 adapted to read the fluid pressure in the connector 12 over the range of fluid pressures for which the device is designed. Connected to the connector 12 is a first capillary tubing 14, the other end of which is connected to a connector 15 having a second pressure gauge 16 connected thereto and adapted to read the fluid pressure in the connector 15, over the range of fluid pressures for which the device is designed. Also connected to the connector 15 is a second capillary tubing 18, the other end of which is connected to a connector 19, having in its line a T-coupling 20 connected with a flushing valve 21 and an outlet valve 22 in turn connected to an outlet 23 which preferably is a standard pipe or tubing coupling adapted to be connected to a point of use (not shown) of the gas delivered from the outlet 23. Also, connected to the connector 12 is a capillary tube 17 downstream of the pressure gauge 13, provided with a valve 17a. Such capillary tube 17 is provided so that an exhaust through it can be provided and regulated for a given setting of the regulator 11. Its optional use can be useful in several circumstances in which the flow through the outlet 23 is small. One example is in a situation where a mixture of gases is being pressed through the flowmeter in which the mixture contains one component at low concentration which can react slowly with one of the materials in the regulator 11, which upon such reaction would lower the concentration of such component in the mixture discharging from the outlet 23 below the concentration thereof at the inlet 10. This change in the proportion of the components passing through the flowmeter is undesirable and can be reduced by decreasing the residence time of the gas in the regulator 11 by increasing the flow rate through it and extending a portion of such flow through the capillary 17 by opening the valve 17a a desired amount. An example of such use is in a situation where a gaseous mixture originally containing about 10 parts per million of hydrogen sulfide is to be passed through the flowmeter and discharged from the outlet 23 at about 0.1 cc/min., where the regulator 11 has a brass part or parts in contact with the gas stream passing therethrough and with which the hydrogen sulfide in the mixture would react if allowed in long contact with such brass part or parts. Such capillary tube 17 may also be used as an exhaust of part of the gas or gas mixture entering the inlet 10 to increase the flow rate through the regulator, as some such regulators are capable of closer pressure regulation if the flow rate through them is not too low.

Commonly, it is desired to deliver gas at a specified mass flow rate from the outlet 23 at about atmospheric pressure, e.g., 0.5 in. of $H_2O$, and with a relatively small mass flow rate, e.g., 0.1 cc/min. to 10 cc/min. Or the range of gas flow delivery desired may be from 1.0 cc/min. to 100 cc/min., or some other similar range. By properly selecting capillary tubes 14 and 18 having the required dimensions, internal diameter and length, the desired range of gas delivery flow rates for a given outlet pressure and temperature may be provided in a single instrument made in accordance with this invention.

The capillary tubes 14 and 18 are preferably made from standard stainless steel hypodermic needle tubing, due to its adaptability for use with both corrosive and noncorrosive gases, and because of its ready availability on the open market in 10′ sections and a nominal internal diameter of 0.004 inch which is particularly suitable for such capillary tubes in instruments for which the present invention is particularly adaptable, although such tubing is readily available in other diameters. For example, I have found that to provide a flow of nitrogen at the rate of 100 cu. cm./min. through such standard tubing requires tubing having an internal diameter of 0.005 inch and a length of 3.6 inches, or a tubing having an internal diameter of 0.004 inch and a length of 1.47 inches. From another angle, I have found that such tubing having an internal diameter of 0.004 inch will provide a gas flow rate of only 1 cu.cm./min. if 147 inches in length, but a flow of 10 cu.cm./min. if only 14.7 inches in length. These are based on inlet and outlet pressures of 30 and zero p.s.i.g., respectively.

The equation for the flow rate of a gas, having viscosity $n$, through a tube having an inner diameter $d$ and a length $l$, is related to the inlet and outlet pressures in the tubing, $P_1$ and $P_2$ respectively, is as follows:

$$Q = 5.7 \times 10^4 \, d^4 \, (P_1^2 - P_2^2)/nl$$

where
$Q$ = flow rate in $cm^3$ atm/min., i.e., mass flow if temperature is specified;
$d$ = internal tube diameter in inches;
$l$ = tube length in inches;
$P_1$ = inlet pressure in p.s.i.a.;
$P_2$ = outlet pressure in p.s.i.a.;
$n$ = gas viscosity in poise.

From the foregoing, knowing the nature of the gas being handled by the flowmeter of this invention, its viscosity and temperature and the desired use pressure of the gas, the internal diameter of the capillary tubing and the inlet pressure and the desired flow rate of the gas, simple calculation will provide the required length of the capillary tubing to provide the required flow rate under such conditions. Knowing the dimensions of the capillary tubing and all of the other said factors, other than the flow rate, simple calculation will provide the flow rate.

To avoid variations and interruptions of gas flow through the capillary tubes 14 and 18 it is essential that constriction of the tubes, as by solids or liquids in the gas, must be avoided. In handling flow rates of from about 0.2 $cm^3$ atm/min. to 2.0 $cm^3$ atm/min. of gases of moderate purity I have experienced no constriction problems, given reasonably clean care and handling of the apparatus. However, using my device with a gas containing appreciable amounts of foreign solids or liquids, I prefer to incorporate a filter 25 in the connector 12, or alternatively in the inlet 10. Such filter 25 may be any conventional sintered metal filter in which the fluid pressure drop across it is small compared with the fluid pressure indicated by the gauge 13 at the maximum fluid flow rate through the connector 12.

All elements of the device, other than the capillary tubes 14 and 18, are designed so that the fluid pressure drop across each is low compared to the minimum pressure drop across either of the tubes 14 or 18.

In operation, the valves 21 and 22 are closed, the inlet 10 is connected to the gas supply (not shown), and the outlet 23 is connected to a suitable point of use (not shown). Preferably, the device is then flushed by opening flushing valve 21 and adjusting the pressure regulator 11 to permit a flow of gas from the inlet 10, through the device, and out of the flushing valve 21 to atmosphere or disposal, which clears the system of foreign gas and eliminates air bubbles from the system, the flow rate of flushing gas being indicated by the pressure reading on the gauges 13 and 16. When flushing has been completed, normally requiring only a few seconds, the flushing valve 21 is closed and the outlet valve 22 is opened to permit flow to the point of use of the gas being handled. The pressure regulator 11 is then adjusted to provide a flow of gas into the connector 12 that will provide a desired mass flow of gas out of the outlet 23 at a desired outlet pressure, such as one atmosphere, the mass flow rate being indicated by the pressure gauges 13 and 16.

The use of the two gauges 13 and 16 provides a safety feature to indicate malfunctions in the device, and this is also an object of the invention. For example, during normal use, if the pressure indicated by the gauge 13 is normal, but the gauge 16 indicates a pressure higher than normal and desired for a given mass flow of gas, it indicates a constriction in the capillary tube 18 or downstream therefrom, and remedial measures can be taken to correct the malfunction. Similarly, if the pressure indicated by the gauge 13 is normal, but the pressure indicated by the gauge 16 is lower than normal, it indicates a blockage or constriction in the capillary tube 14. Again, a lower than normal pressure indicated by the gauge 13 will indicate an inadequate inlet pressure or a malfunction in the pressure regulator 11.

Sometimes an available gas supply source, such as a conventional gas cylinder or bottle, is provided with a pressure regulator and a gauge, similar to the regulator 11 and gauge 13, in which case such elements are not required in the flowmeter of this invention. For some applications, the valves 21 and 22 may be omitted, although they add to the usefulness of the device described herein. Similarly, for some applications the second gauge 16 and second capillary tube 18 may be omitted, although their inclusion adds to the versatility of the invention.

Obviously, the mass gas flow rate at the outlet 23 may be varied by varying the pressure of the gas delivered by the pressure regulator 11 or by substituting a different capillary tube or tubes for the tubes 14 or 18, or both, having a different internal diameter or length or both.

Although I have shown and described a preferred embodiment of this invention, and have suggested various modifications thereof, it is to be understood that I do not desire to be limited thereto, but desire to be afforded the full scope of the following claims:

I claim:

1. In a meter for regulating the flow of a fluid, the combination of:
   pressure regulating means for delivering a desired and uniform mass flow of a fluid to an outlet;
   a first conduit connected to said outlet;
   a pressure gauge connected to said first conduit;
   a capillary tubing one end of which is connected to said first conduit;
   a second conduit connected to the other end of said capillary tubing and having an outlet;
   an outlet valve connected to the outlet of the second conduit; and
   a flushing valve connected to said second conduit upstream of said outlet valve.

2. In a meter for regulating the flow of a fluid, the combination of:
   pressure regulating means for delivering a desired and uniform mass flow of a fluid to an outlet;
   a first conduit connected to said outlet;
   a pressure gauge connected to said first conduit;
   a capilary tubing one end of which is connected to said first conduit;
   a second conduit connected to the other end of said capillary tubing and having an outlet; and
   means disposed between said pressure regulating means and said capillary tubing for bleeding off a portion of the fluid to increase the velocity of the flow of fluid through said regulating means and to control the same.

* * * * *